United States Patent
Ascari et al.

(10) Patent No.: US 7,581,491 B2
(45) Date of Patent: *Sep. 1, 2009

(54) MACHINES USED FOR PEELING AND CORING MELONS AND PINEAPPLES

(75) Inventors: Carlo Ascari, Cavezzo (IT); Luca Ascari, Cavezzo (IT)

(73) Assignee: A.B.L. s.r.l., Cavezzo (Modena) (IT)

( * ) Notice: Subject to any disclaimer, the term of this patent is extended or adjusted under 35 U.S.C. 154(b) by 516 days.

This patent is subject to a terminal disclaimer.

(21) Appl. No.: 11/190,909

(22) Filed: Jul. 28, 2005

(65) Prior Publication Data
US 2006/0021522 A1 Feb. 2, 2006

(30) Foreign Application Priority Data
Jul. 28, 2004 (IT) .................... MO2004U0017 U

(51) Int. Cl.
A23N 7/00 (2006.01)

(52) U.S. Cl. ............................. 99/489; 99/491; 99/546; 99/584; 99/588; 99/589; 99/636

(58) Field of Classification Search ........... 99/539–546, 99/588–599, 584, 486–492, 600–643; 426/481–483
See application file for complete search history.

(56) References Cited

U.S. PATENT DOCUMENTS

| 1,872,731 | A * | 8/1932 | Goranson et al. ............. 99/593 |
| 2,882,945 | A * | 4/1959 | De Back et al. ............... 99/546 |
| 6,237,475 | B1 * | 5/2001 | Ascari et al. .................. 99/543 |
| 6,740,347 | B2 * | 5/2004 | Ascari ......................... 426/231 |
| 6,796,224 | B2 * | 9/2004 | Ascari et al. .................. 99/489 |
| 6,966,254 | B2 * | 11/2005 | Ascari et al. .................. 99/489 |

* cited by examiner

*Primary Examiner*—Timothy F. Simone
(74) *Attorney, Agent, or Firm*—Young & Thompson

(57) ABSTRACT

The present invention relates to an improvement effected in the peeling and coring machines used for peeling and coring melons and pineapples, the improvements being that the machine:
- is able to indifferently peel one or the other type of fruit, after a simple replacement of a kit of sharp blades;
- is able to remove the peel (skin) of the fruit, by acting on the inside of the fruit;
- is able to separate the pips and the central part of melons which contains these pips, and to remove the fibrous inner stem of the pineapple.

11 Claims, 11 Drawing Sheets

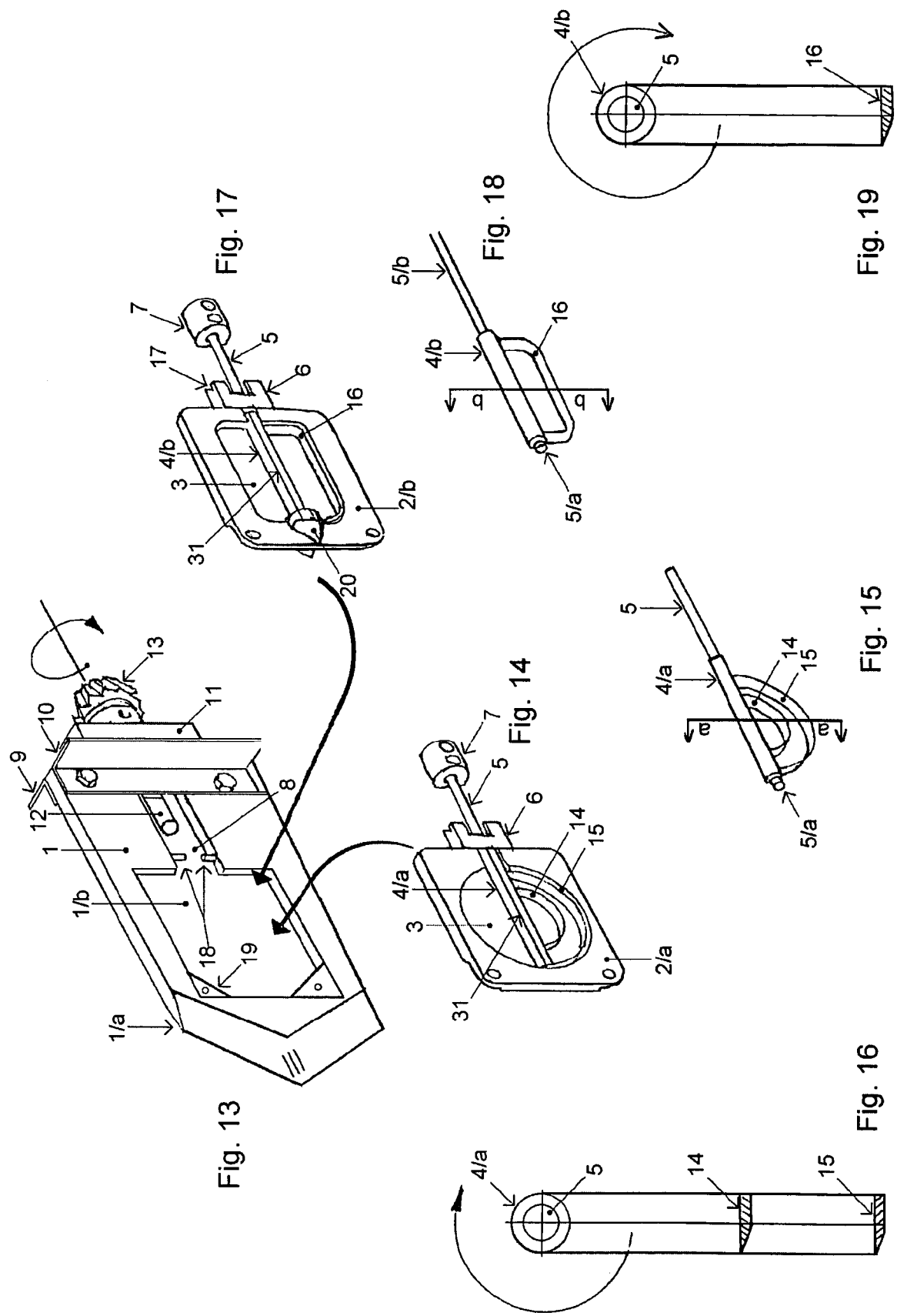

US 7,581,491 B2

MACHINES USED FOR PEELING AND CORING MELONS AND PINEAPPLES

BACKGROUND OF THE INVENTION

The present invention relates to some improvements in machines used for peeling a fruit, for longitudinally cutting it into two halves, and for removing inedible parts located inside the fruit.

DESCRIPTION OF THE RELATED ART

The present state of the art includes machines capable of processing only melons, and alternatively, machines capable of processing only pineapples. Generally, the peeling is performed only from outside and it does not occur at the same time with the emptying of the inner part; moreover, these operations require time and are not accurate, meaning by "not accurate" that they either do not remove all pieces of peel, or a considerable amount of edible parts is thrown away. As concerns pineapples, which have a longitudinal, fibrous inner body, connecting the stipe to the flower, first their two ends are cut off and then the fibrous body or stem is removed by employing a circular plug cutter; furthermore, by using a second plug cutter of adequate diameter, one separates—always manually—the edible part from the peel/skin (discarding in this way a great portion of edible part); finally, the pulp is cut in the form of "washers", segments/slices, or cubes.

SUMMARY OF THE INVENTION

The object of the present invention is to provide users with a machine which in a single processing station automatically splits the fruit into two parts along its longitudinal axis, and which further separates the skin from the pulp by cutting the skin on the inside of the fruit, and finally, which simultaneously discards the pips and the "placenta" (central part containing the pips) in case of a melon, and the fibrous body (fibrous stem) in case of pineapples. A second object consists in that by simply replacing a tool-bearing plate, the machine will be capable of processing either melons or pineapples, and when considering the same type of fruit, the processing can be adapted to the "gauge" (size) of the groups into which the lot of fruits has been divided.

A further object is that, after registration of an adjustment means, the fruit can always be positioned so that its center of gravity lies on the axis of rotation of the tools used to separate—at the same time—the fruit peel and the fruit core.

These and further objects will be achieved by a machine according to the present invention, which is characterised in that it comprises:

a mechanical feeder, which at the same time centres the fruit in the vertical direction;

an assembly of clamping pliers, which during the clamping of a fruit automatically centres the latter both radially and axially;

intermittently and/or alternatively operating mechanical assemblies, which are or may be synchronised with respect to each other, wherein all these assemblies are operatively interconnected in order to let the centre of gravity of the fruit coincide with centre of rotation of semicircular blades or of blades configured according to the typology and shape of the fruit to be processed and according to the gauges into which each lot of fruits is subdivided;

wherein the blades separate, from the inside of the fruit, both the fruit skin and its core;

a circular plug cutter, suited to separate the central fibrous stem of a pineapple;

a series of kits of semicircular blades, which can be mounted and replaced on a lance-shaped splitting blade that longitudinally cuts the fruit into two halves, said splitting blade being adapted to receive said kits.

BRIEF DESCRIPTION OF THE DRAWINGS

Other objects and advantages of the present invention will result in more detail from the description of one of its embodiments, which is considered to be preferred but not unique and which is shown for illustrative and non-limitative purposes in the attached drawings, wherein:

FIG. 3 shows a trolley with a cradle onto which the fruit is manually put;

FIG. 4 shows the trolley with the fruit already put on the cradle;

FIG. 5 shows the fruit clamped between the dish and an elastic pushing means, and positioned at the required height;

FIG. 6 is an orthogonal view from the top of FIG. 5;

FIG. 7 shows the assembly of the four self-centring pliers which automatically clamp and centre (i.e. align) the fruit with respect to the blades used to core and peel the fruit;

FIG. 8 shows the assembly comprising the clamping and self-centring pliers, and the blade that splits the fruit into two parts;

FIG. 9 illustrates the same thing as FIG. 8, but with the splitting blade already driven into the fruit;

FIG. 10 is an orthogonal view in the direction of arrow F1 of FIG. 9, which also includes the two semicircular blades used to separate both the peel and the "placenta", in case the fruit to be processed is a melon;

FIG. 11 is a top view in the direction of arrow F2 of FIG. 10, after retracting the splitting blade from the fruit;

FIG. 12 is a further top view showing the fruit at the time it is released from the self-centring pliers (after its processing);

FIG. 13 shows the blade used to longitudinally divide the fruit into two halves;

FIG. 14 shows a kit of semicircular blades suited to peel and core melons;

FIG. 15 shows, in particular, the blade support and the blades to be inserted in the kit of FIG. 14;

FIG. 16 is a diametrical cross section taken along the line a-a in FIG. 15;

FIG. 17 shows a kit suited to peel and remove the longitudinal inner body (stem) of a pineapple;

FIG. 18 shows, in particular, the blade support and blade to be inserted in the kit of FIG. 17;

FIG. 19 is a diametrical cross section according to line b-b of FIG. 18;

FIG. 20 schematically shows the pineapple when it has not yet reached the splitting blade and plug cutter used to remove said body or stem;

FIG. 21 shows the pineapple during its cutting effected by the splitting blade;

FIG. 22 shows the step when the plug cutter, used to remove the stem, has started to perform its task;

FIG. 23 shows one half of the fibrous stem, as it exits from the processing cycle;

FIG. 25 is a view in the direction of arrow F3 of FIG. 24; moreover, in these FIGS. 24 and 25 the mechanical assemblies shown in FIGS. 26 and 27 have been omitted in order to facilitate the interpretation of the drawings, although they are present in the former figures;

FIG. 27 is a view taken in the direction of arrow F4 of FIG. 26; in these figures, the components shown in FIGS. 24 and 25 have been omitted—although they are part of these assemblies—in order to facilitate the interpretation of the drawings;

FIG. 34 is a view of FIG. 33 from the arrow direction F6;

In the various figures the same alphanumeric reference symbols indicate the same parts or elements.

DESCRIPTION OF THE PREFERRED EMBODIMENTS

Figure 1:
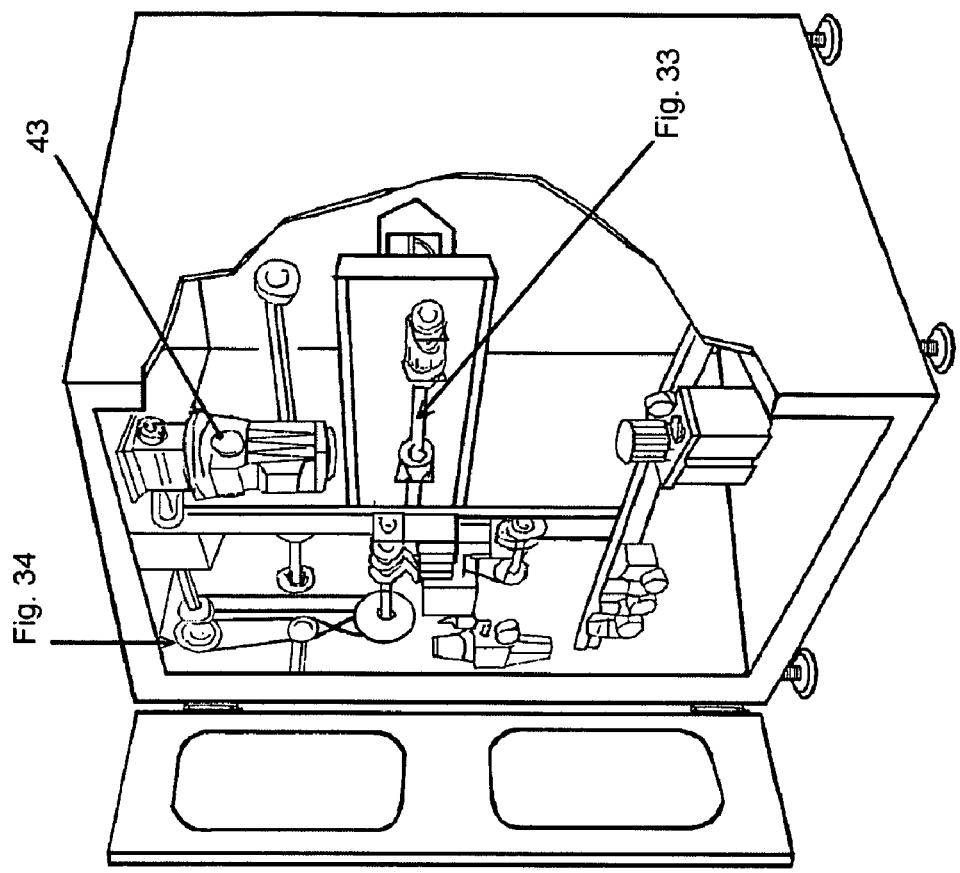
FIG. 1 is a front, very schematic view, of the machine; this view and the following one have the purpose of indicating the spatial position of the main devices that characterise the machine.
Figure 2:
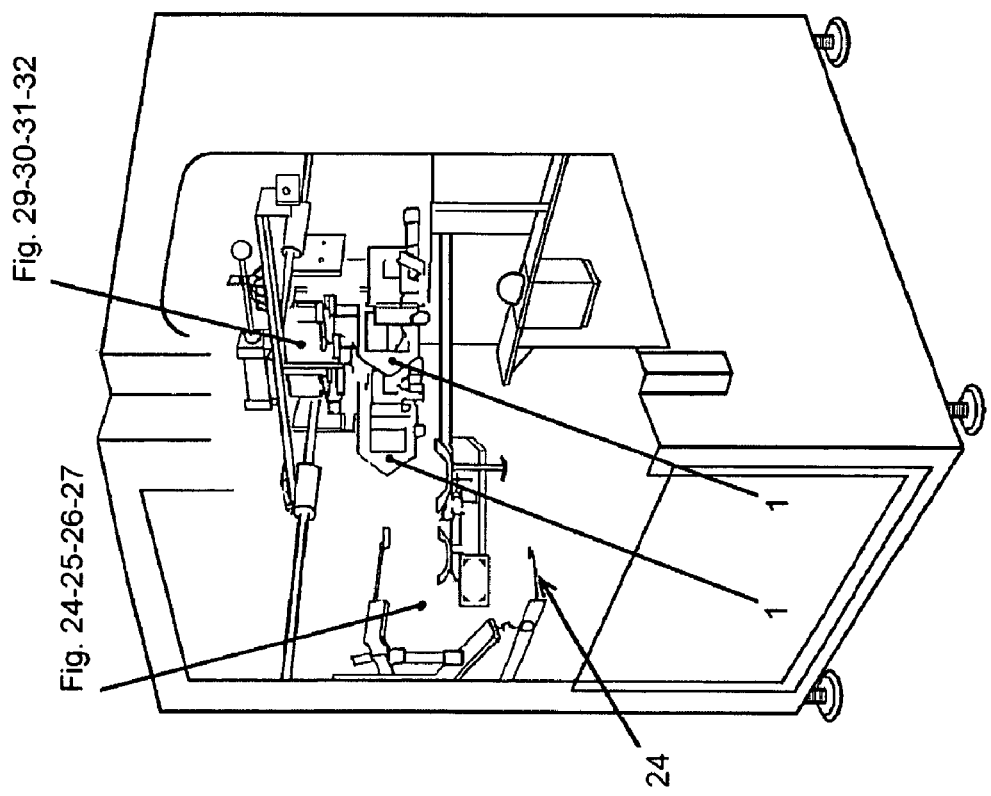
FIG. 2 is a rear view; it illustrates schematically the main drive assemblies contained inside the machine; the machine works simultaneously on two processing (or production) lines.
Figure 3:
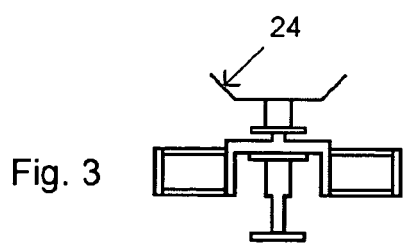
FIGS. 3 to 12 schematically and sequentially show the various steps of a melon processing cycle, which substantially do not differ from the steps required for a pineapple processing cycle; and in particular.
Figure 4:
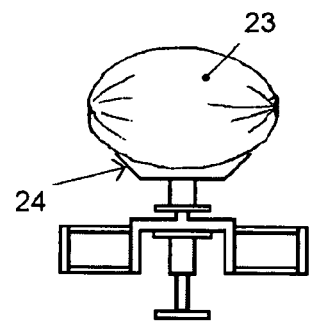
Figure 5:
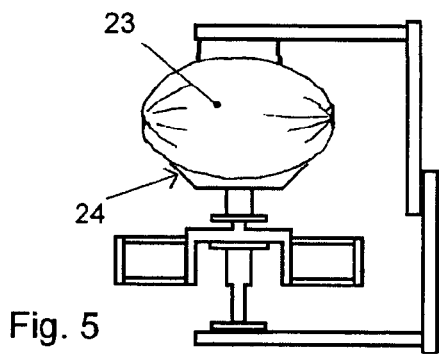
Figure 7:
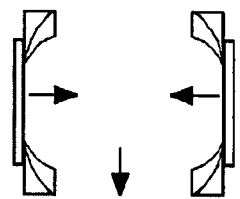
Figure 6:
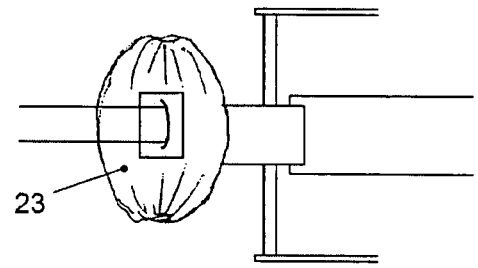
Figure 8:
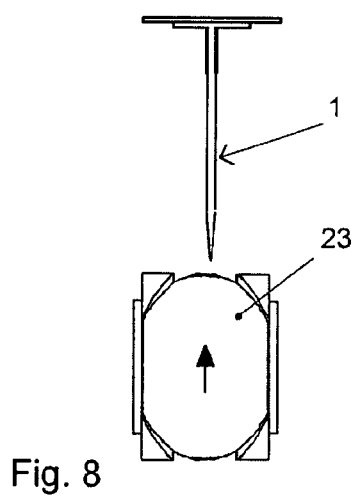
Figure 9:
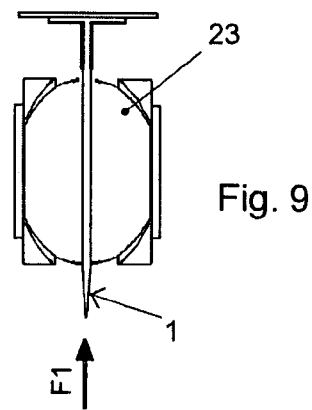
Figure 10:
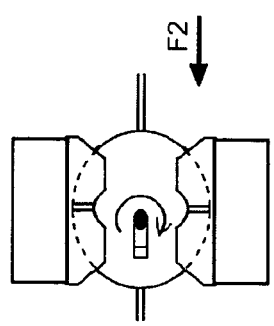
Figure 11:
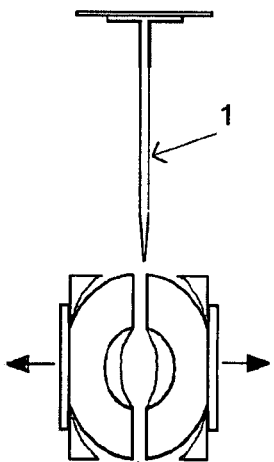
Figure 12:
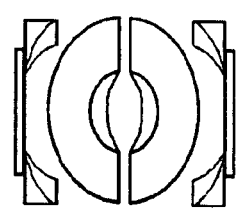

With reference to the drawings, 1 denotes (see FIG. 13) a flat blade, chamfered at the tip 1/a and suited to longitudinally split into two equal parts the fruit to be processed. The blade 1, with regard to its length and width, has an adequate size, insuring that the largest fruit to be processed by the machine can be suitably cut. In the flat portion of the blade 1 there is provided an aperture 1/b in which a plate 2/a can be introduced and fixed, in case melons are to be processed, or in which a plate 2/b may be attached, in case one intends to process pineapples.

The plate 2/a has a central aperture 3 of circular or oval shape according to the varieties of melons and therefore according to their geometric forms; in the plate 2/b the aperture has a rectangular form with rounded corners. Into the aperture 3 of both plates 2/a, 2/b it is possible to insert a tubular sleeve 4/a, 4/b which is threaded on a spindle 5, and this sleeve 4 may—for instance—be fixed to the spindle 5 by means of threaded security dowels (not shown); the spindle 5 is guided through the blade 2/a or 2/b along their center line and is supported at one of its ends 5/a directly in a hole driven in the respective plate, while at the opposite end the spindle is supported in a hole driven in a support 6 which is integral with the plate, and it projects and terminates in a joint 7.

The aperture 1/b of the blade 1 extends as far as a slit 8 which in turn reaches the outside region of the blade at the opposite end with respect to the chamfered portion. Two brackets 9, 10 connect to each other the end parts of the blade 1, and they also allow to rigidly fix the blade 1 (which will be adequately positioned and oriented) to a wall of the frame forming the base of the machine. At the same end where the brackets 9, 10 are provided, a support 11 rotatably supports a tubular shaft 12 which carries a pinion 13. Two blades 14, 15 are integral with the sleeve 4/a at their respective ends and they are formed each by a thin blade of steel, which is bent (arched) and which is chamfered on one side of its thickness, so that, actually, these blades become razor-sharp. The sleeve 4/b supports only one blade 16 having the configuration shown in FIG. 18; the form of the blades 14, 15, 16 is selected according to the variety of fruits to be processed and to their size. The plate 2/a, the sleeve 4/a with the respective blades 14, 15, the spindle 5 and the joint 7, together form a kit that can be inserted in, or replaced/removed from, the blade 1.

A kit will be available for each gauge (size) of melons to be processed and a corresponding kit will also be available for each gauge of pineapples; they may all be replaced on one and the same blade 1.

The support 6 integral with each plate 2/a, 2/b has slots 17 and a size suited for its introduction into the slit 8 of the blade 1, while the slots 17 are suited to receive pins 18 which are present inside the slit 8. To assemble the kit to the blade 1, the support 6 is first introduced in the slit 8, taking care that the pins 18 are received inside the slots 17, then the plate 2/a (or 2/b) is laid on support brackets 19 and two screws are used to fasten the plate to the blade 1; thereafter, the spindle 5 is connected by means of the joint 7 to the shaft 12 and the assembling is ended.

If the pinion 13 is rotated, also the blades 14, 15 are set in rotation. If we suppose that melons are to be processed, then the blade 15 will act near the inner side of the fruit skin, while the blade 14 will act slightly outside the space occupied by the pips and the "placenta" (central part containing the pips); in the case of the pineapples, only one blade 16 is provided, and the latter will be located near the inner side of the skin.

It should be noted that that the outside diameter of the sleeves 4/a and 4/b and the thickness of the plates 2/a and 2/b should not exceed the thickness of the blade 1, since when the splitting blade 1 divides the fruit into two halves the blades 14, 15, 16 should not protrude beyond the thickness of the splitting blade 1, as shown in FIGS. 14 and 17. In these conditions, if a fruit is stuck longitudinally by the blade 1, this fruit is divided into two parts, and if these two parts of the fruit are held adherent to the splitting blade 1 while the blades 14, 15 are rotated only once by 360° (acting on pinion 13), the result will be the following:
- two empty caps formed by the fruit skin;
- two peeled caps of edible pulp (skinless and pipless);
- a central body ("placenta") containing the pips, At the end of the working cycle the machine will discharge all this on a conveyor belt (no corresponding description or illustration is given since this is assumed already known in the art) and an operator will pick the caps of edible pulp while the remaining parts (to be thrown away) are collected by a container of waste products.

Figure 37:
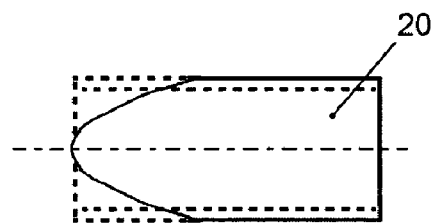
FIGS. 37 and 38 are two orthogonal views of the circular plug cutter used to remove the inner body or stem of a pineapple; these figures are useful to improve the understanding of the manufacturing steps of the plug cutter.
Figure 38:
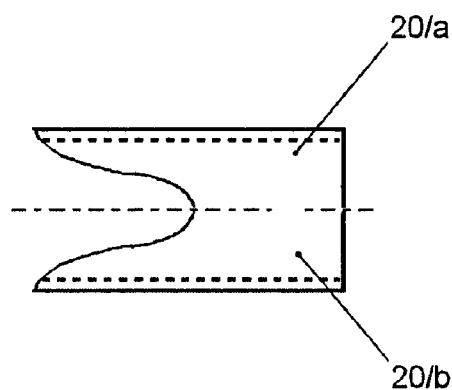
Figure 39:
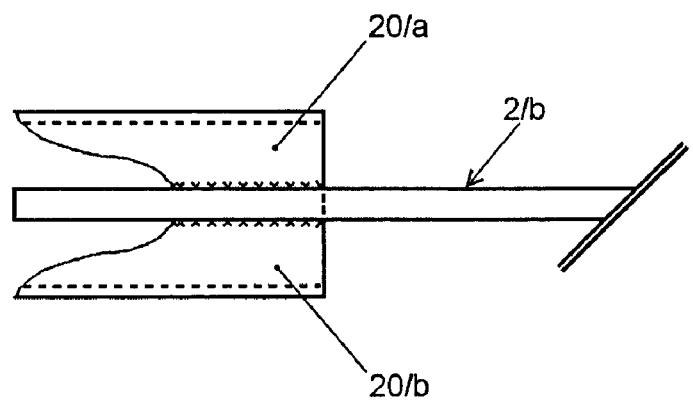
FIG. 39 shows where and how the plug cutter is attached.

In the case of pineapples, in order to remove the fibrous central body or "stem" extending axially from the flower to the stipe, a circular plug cutter is provided on the blade 2/b, and this plug cutter is obtained as follows (see FIGS. 37, 38, 39):
- starting from a steel tube 20 suited for the intended purpose (FIG. 37), one end of the tube is cut in the manner shown in FIGS. 37, 38;
- the whole profile is chamfered/sharpened;
- the tube is axially cut along its center plane so as to obtain two halves of the plug cutter, 20/a and 20/b, which thereafter are connected by welding, in aligned positions, on the two sides of the plate 2/b as shown in FIG. 39 and FIG. 17.

Figure 22:
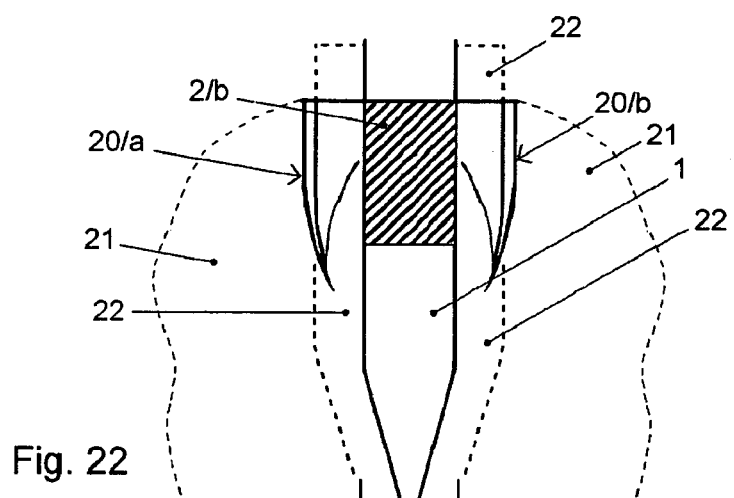
FIGS. 20 to 23 show the successive steps of the separation of the pineapple from its internal fibrous body (stem), and specifically.
Figure 21:
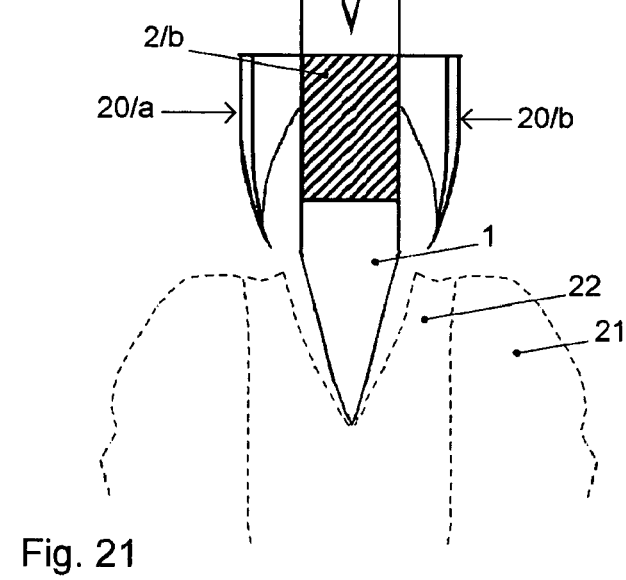
Figure 23:
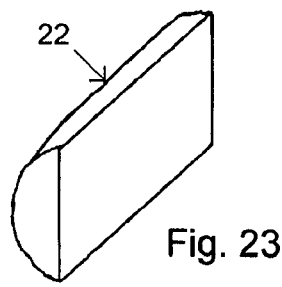
Figure 20:
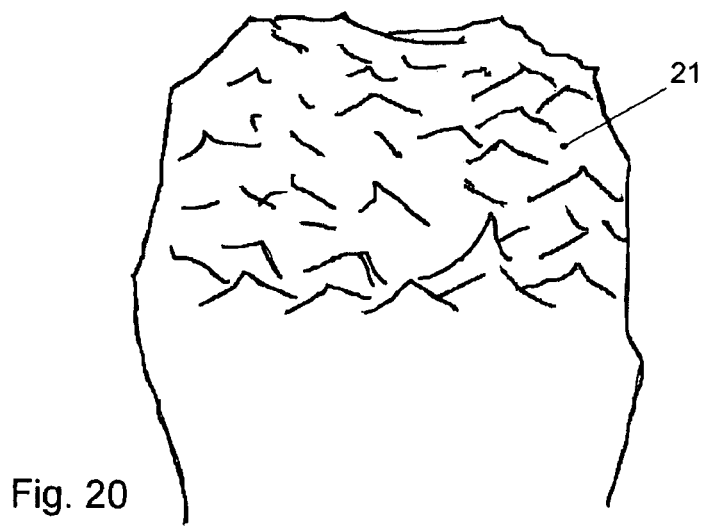
Figure 25:
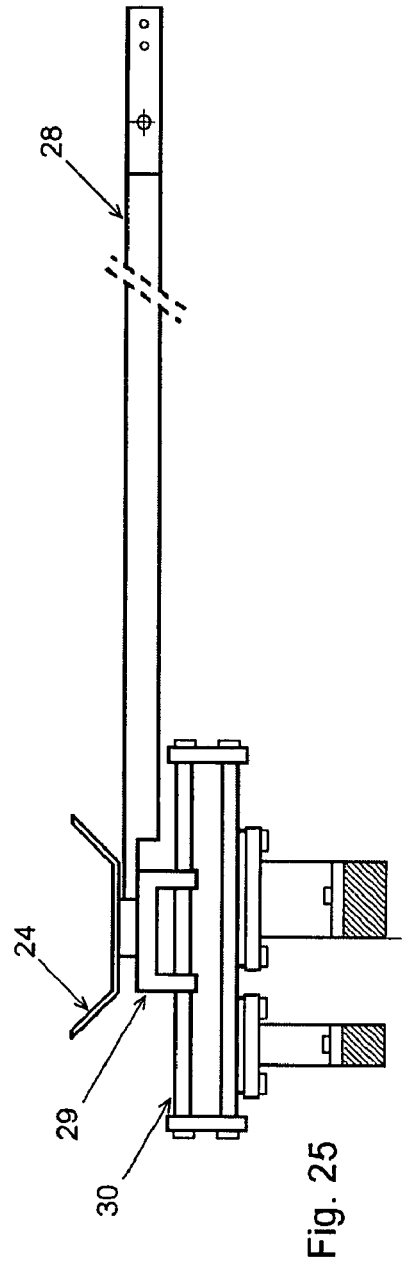
FIGS. 24 and 25 are two orthogonal, schematic views of the feeder device onto which are laid individual fruits to be processed; in particular.
Figure 24:
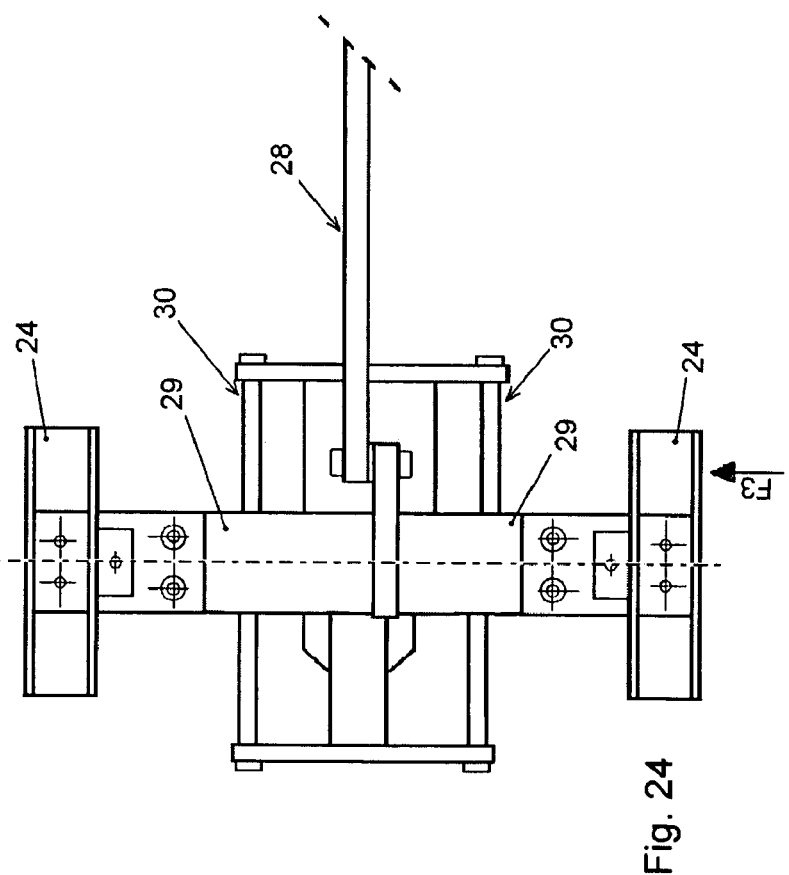

The function of this plug cutter is illustrated in FIGS. 20, 21, 22, where 21 denotes the pineapple whose ends have been cut off before, and 22 denotes the fibrous central stem. When the blade 1 starts splitting the pineapple, the stem 22 (see FIG. 21) is gradually divided into two halves. At a certain moment during this penetration step of the splitting blade 1, the fibrous stem 22 will contact the plug cutter 20/a, 20/b and will be separated from the pulp (flesh) of the pineapple at its outer circumference; finally, the fibrous stem will be divided into two "half-carrots" like that shown in FIG. 23.

As concerns the operation involving the feeding of the fruits (see FIGS. 24, 25, 26, 27) it must be stated in advance that the described embodiment of the machine, schematically illustrated in the attached drawings, includes two parallel processing lines of the fruits.

Figure 27:
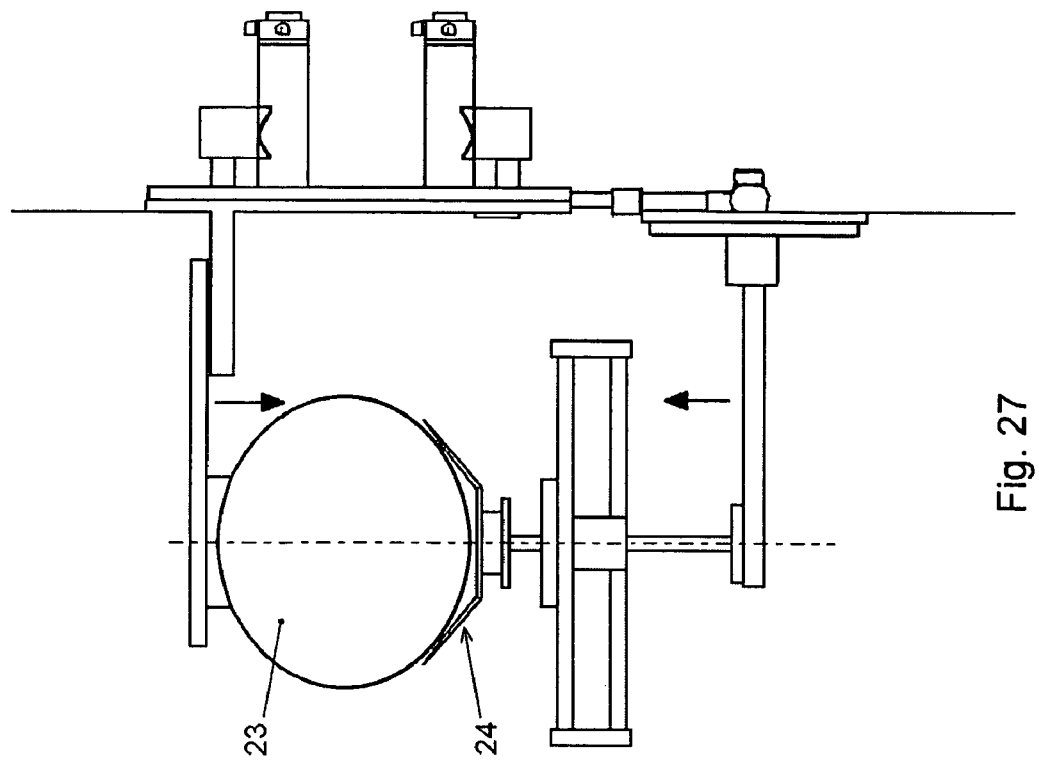
FIGS. 26 and 27 are two orthogonal views schematically showing a possible mechanical assembly used to clamp—from above—the fruit to be processed, which fruit was previously laid on the respective cradle (see also FIGS. 24, 25); the cradle and the clamped fruit are also lifted in order to bring them to a level where the fruit centre line is in alignment with the blade rotation axis (FIG. 14); moreover, the assemblies shown in FIGS. 24 to 27 form in reality a single assembly which will subsequently shift the fruit towards the self-centring pliers of FIGS. 29, 30, 31, 32.
Figure 26:
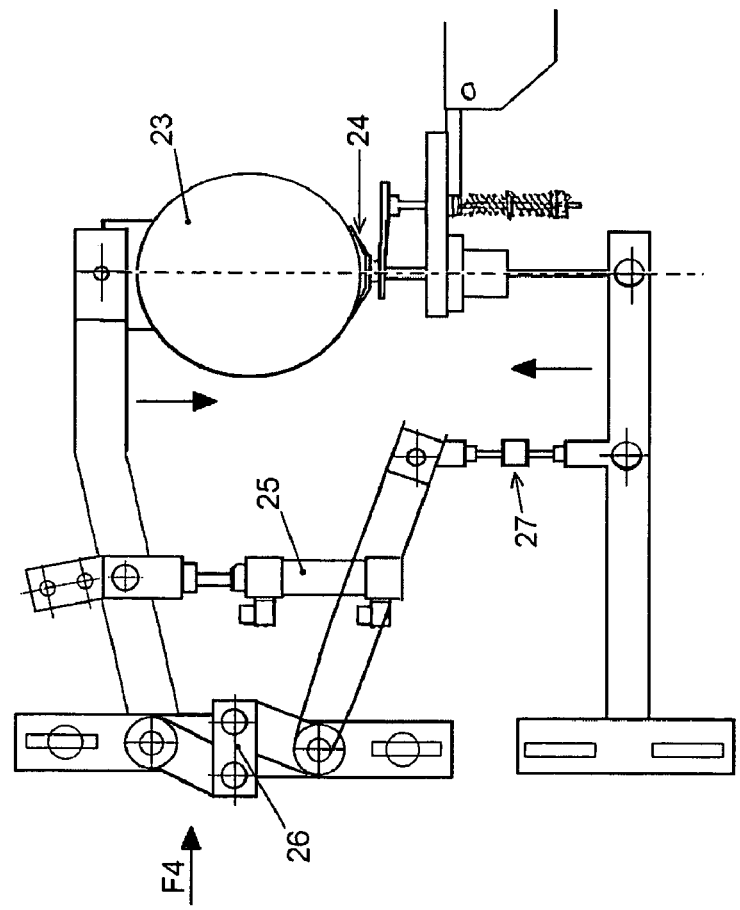

The loading of the fruits 23 is performed manually, that is, they are put on the cradles 24 with their axis pointing in a horizontal direction. An appropriate mechanical assembly, that could be realised in any known manner and an example of which is shown in FIGS. 26, 27, clamps the fruit in the vertical direction and positions the same at a height such that the axis of the fruit is concentric (i.e. aligned) with the axis of rotation of the spindle 5 shown in FIG. 14. Obviously, assuming that a large lot of fruits is divided into several gauges, that is, that the fruits are separated into several groups with diameters comprised in an interval between a minimum value and a maximum value which are sufficiently near to each other, a registration rod (stroke regulation rod) must be provided in the above described device, to take account of the average diameter of each of these gauges into which the lot of fruits has been subdivided. The aforementioned kits of FIGS. 14 and 17 should also be selected in accordance with the gauge of the fruits to the processed. All these measures will contribute to minimise the wastage of edible pulp.

Once the fruits 23 are clamped on their cradles with their axes concentric to (aligned with) the axis of the spindle 5, everything is transferred to the self-centring pliers shown in FIGS. 28 to 31. The mechanical assembly shown in FIGS. 26, 27 has appropriate linkages, a linear actuator 25, a rocking lever 26, and a registration rod (or a similar means) 27 with the function of regulating (registering) the device based on the gauge. The transfer of the fruits from the loading position (FIG. 28) to the region of the pliers (FIG. 29) is carried out by already known means, like the linkage 28 (FIGS. 24 and 25), a linear actuator (not shown in the drawings), and a trolley 29 which supports the device and which moves along guides/rails 30. Once the fruit has reached the position of FIG. 29, it is clamped and automatically centred—both longitudinally and radially (see FIGS. 30 and 31)—, and thereafter the position of its centre of gravity can be assumed known. Then, the device of FIG. 26, 27 is unlocked (released) and the trolley of FIGS. 24, 25 returns to the fruit loading position.

Figure 30:
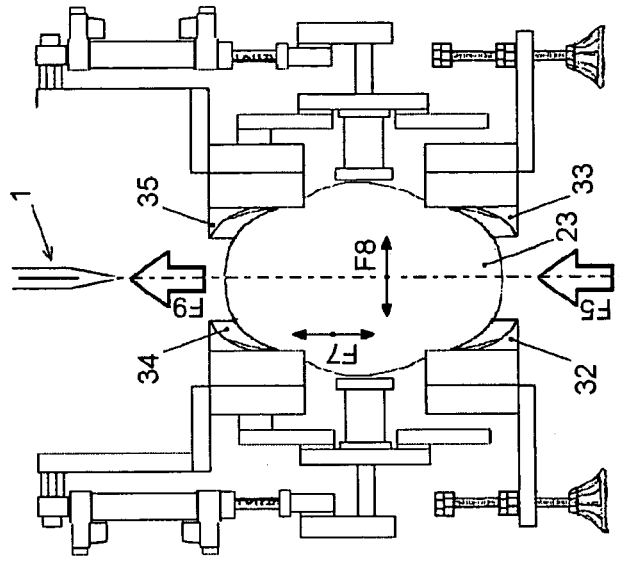
FIG. 30 is a "duplicate" of FIG. 29 but with the fruit clamped by the pliers; at this instant of time the devices of FIGS. 24 to 27 will release the fruit and will return back to their "zero position"
Figure 31:
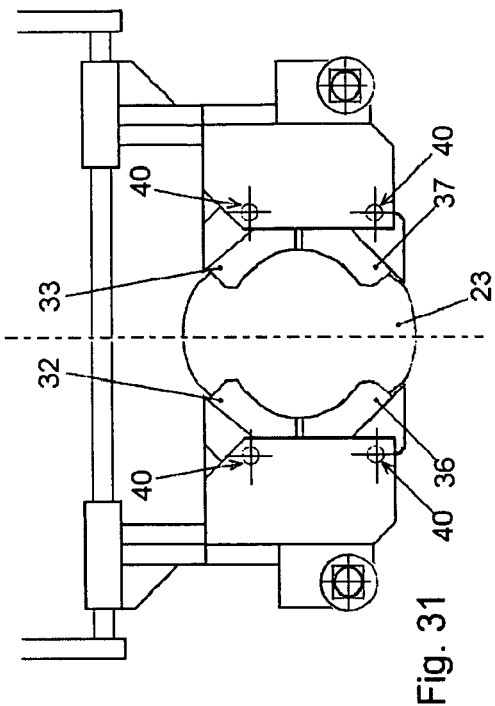
FIG. 31 is a view of FIG. 30 from the direction of arrow F5.
Figure 29:
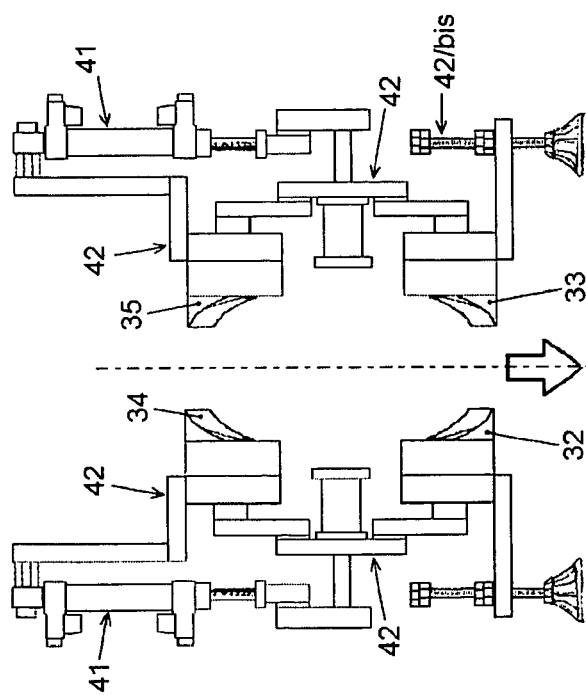
FIG. 29 schematically shows, in top view, the pliers and the associated drive assemblies which, in turn, automatically clamp and centre the fruit in both radial and axial directions.
Figure 28:
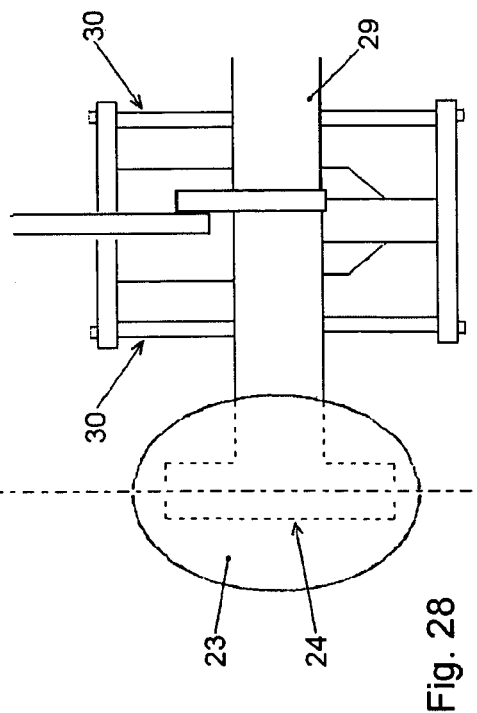
FIG. 28 is a very schematic view and corresponds to FIG. 6; it shows the fruit resting on a feeder cradle and one must imagine that the fruit is already clamped and adjusted at the required height; this is a top view.
Figure 32:
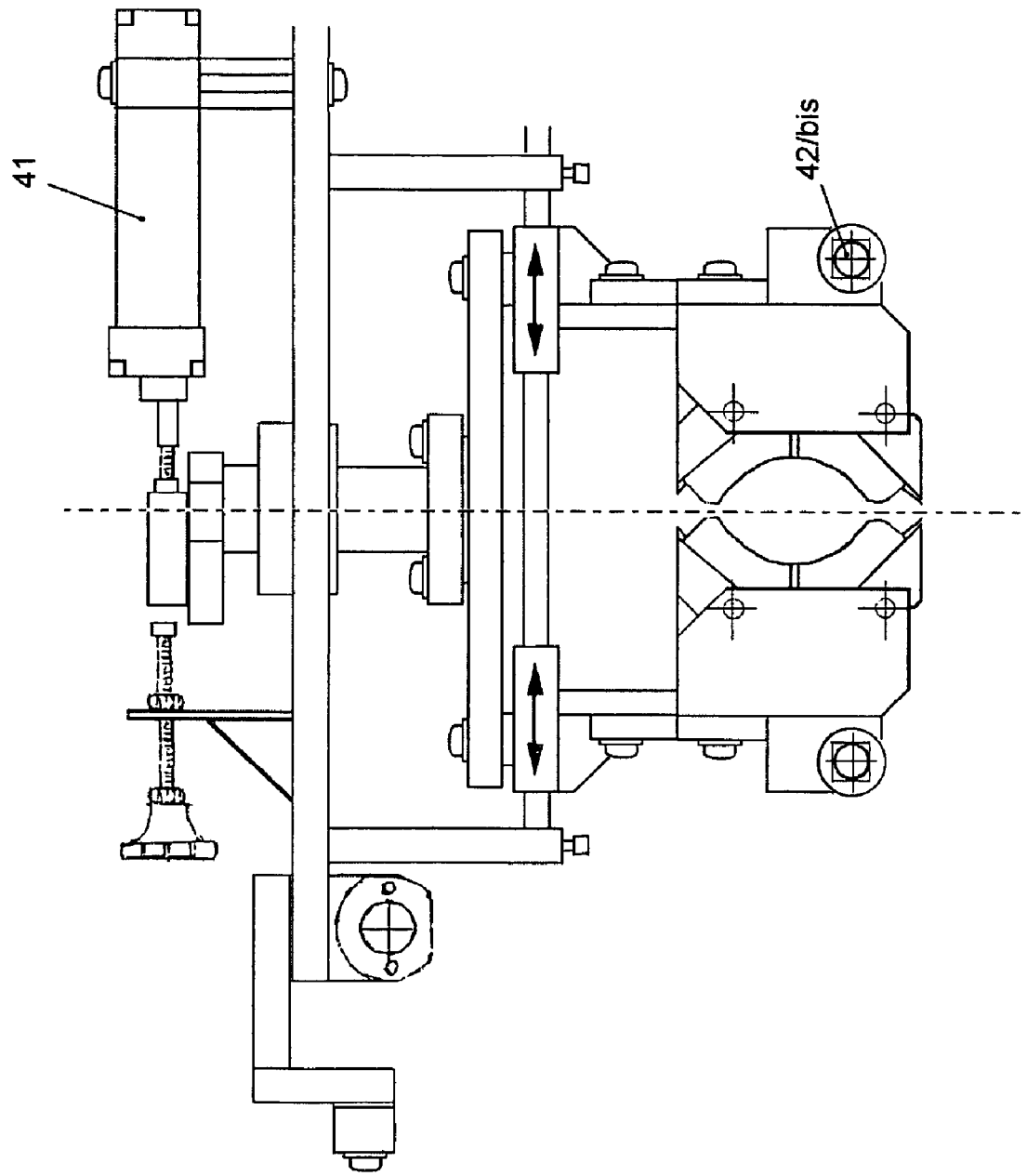
FIG. 32 is a "duplicate" of FIG. 31 but adding the mechanical drive assemblies used to automatically clamp and centre the fruit in the radial direction.

The pliers are characterised in that they include eight jaws 32, 33, 34, 35, 36, 37, 38, 39 (FIGS. 29, 30, 31; the jaws 38, 39 remain hidden in the drawings), which are hinged at 40 to respective supports, and the latter, by means of linear actuators 41 and rocking levers 42, move simultaneously and in a self-centring manner. Thus, all jaws move in the directions indicated by arrows F7, F8 (FIG. 30) until the clamping of the fruit is achieved. At this time, the whole pliers assembly, including the fruit, as shown in FIGS. 30, 31, is shifted by any suitable means already known in the art (not shown) in the direction of arrow F9 and the fruit is driven on the blade 1 so that it is divided into two halves in the longitudinal direction, although it remains united since it is clamped by the pliers; the assembly consisting of the pliers and the fruit stops its motion exactly when the fruit centre of gravity is perfectly concentric with the axis of rotation 31 of the blades 14, 15, 16 (see FIGS. 14 and 17). A transmission mechanism of an intermittent motion, transmitting this motion to the (semicircular) blades 14, 15, 16, is schematically drawn in FIGS. 33, 34; it includes a motor with speed variator, 43, which transmits the motion to a shaft 44, the latter also performing other tasks related to the other assemblies of the machine and transmitting the motion—by means of a chain 45—to the input shaft 46 of an intermittent device 47, whose output shaft 48, by means of couples of bevel gears 49, 50, drives the blades 14, 15, 16 of the two parallel processing lines used to process the fruits.

All motions and functions are synchronised using known devices. Also in the pliers assembly it is required to use stroke adjustment rods (registration rods) 42/bis in order to adjust (FIG. 29) the stroke of the pliers depending on the gauge to be treated.

Figure 35:
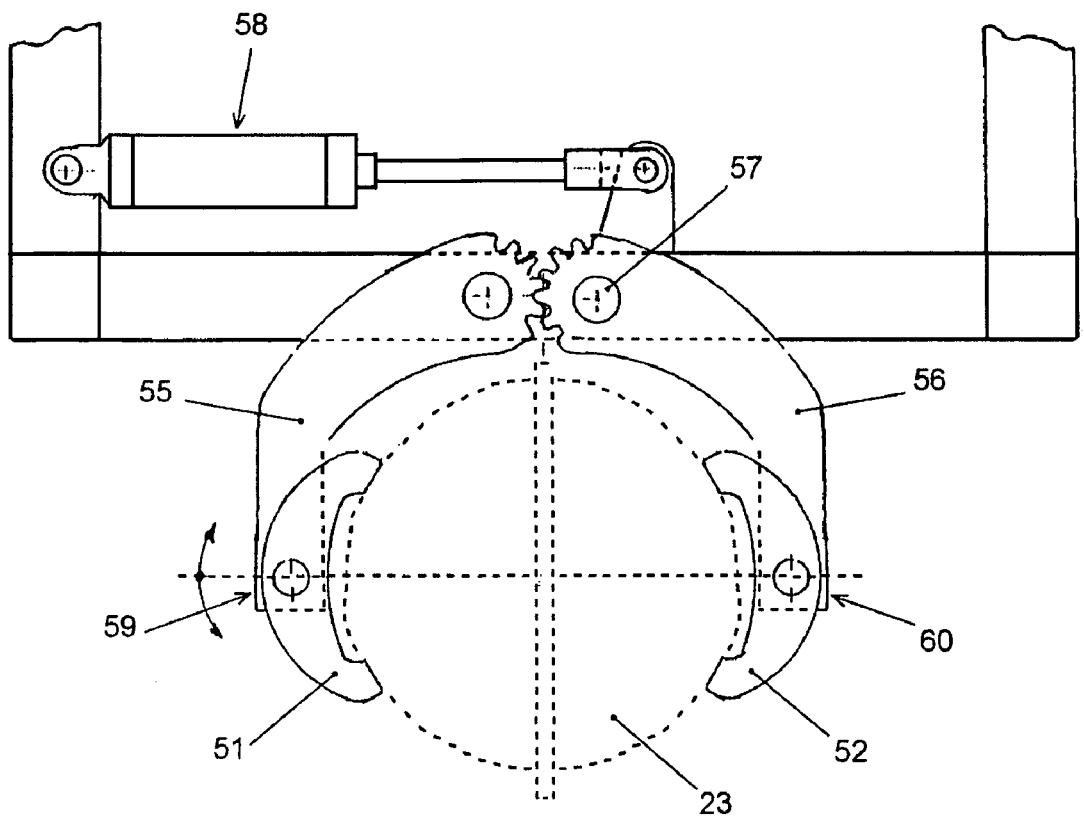
FIGS. 35 and 36 schematically show a possible variant or alternative embodiment of the mechanical assembly and of the pliers used to automatically centre and clamp the fruit both axially and radially.
Figure 36:
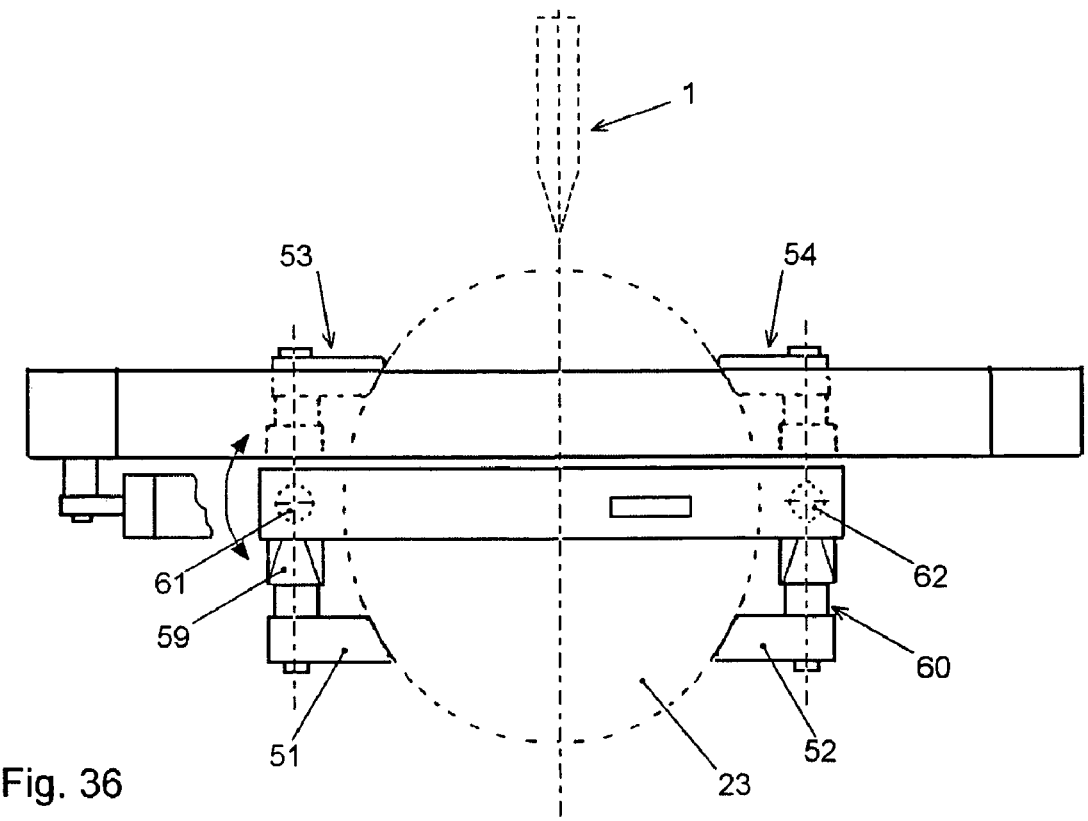

FIGS. 35, 36 schematically show an equivalent mechanical assembly performing the same functions of the pliers depicted in FIGS. 29, 30, 31, 32; it comprises four rocking levers 51, 52, 53, 54 that are supported in pairs by arms 55, 56 which are interconnected at one end by means of gears (teeth), one of these arms being integral with a shaft 57 which is actuated by a linear actuator 58.

The rocking levers 51, 53 and 52, 54 are hinged at the opposite ends of pins 59, 60, which in turn are hinged at 61, 62 at the (free) ends of the arms 55, 56, so that these pins as well will perform the function of rocking levers.

Among possible variants to the embodiment which has been described and illustrated in the attached sheets of drawings, and besides the fruit clamping and self-centring mechanical assembly depicted in FIGS. 35, 36, the following variants should also be considered. The blades which internally peel and core the fruit, and which have been previously defined as "semicircular", will in practice be configured according to the shape of the fruit; moreover, using a single semicircular blade it will also be possible to peel watermelons, obtaining two half-spheres of an eatable product with no skin.

The mechanical assemblies used to displace the fruits and to actuate the blades are of an intermittent and/or alternating kind and may be realised according to any known configuration, provided they are synchronised or may be synchronised.

Moreover, the kit or plate 2/a and 2/b can be inserted and fixed using any kind of known means.

The operation (of the machine) is as follows.

Once the variety of fruits to be peeled and cored has become known, and after subdividing the same according to its gauges, one proceeds as follows:

- a suitable kit is mounted on the splitting blade 1 (FIG. 14 or 17);
- the registration rods 27 (FIG. 26) and 42/*bis* (FIG. 29) are adjusted in accordance with the gauge to be processed;
- electric current is supplied to the machine;
- a respective fruit is manually placed on the corresponding cradle 24 of each processing line, taking care that the axis of the fruit is horizontal and the orientation is always the same, that is, the stipe is always oriented towards the operator's side or always to the opposite side, depending on the kind of fruit.

In the case of pineapples, the pineapple ends need to be cut off before the processing is started; then

Figure 33:
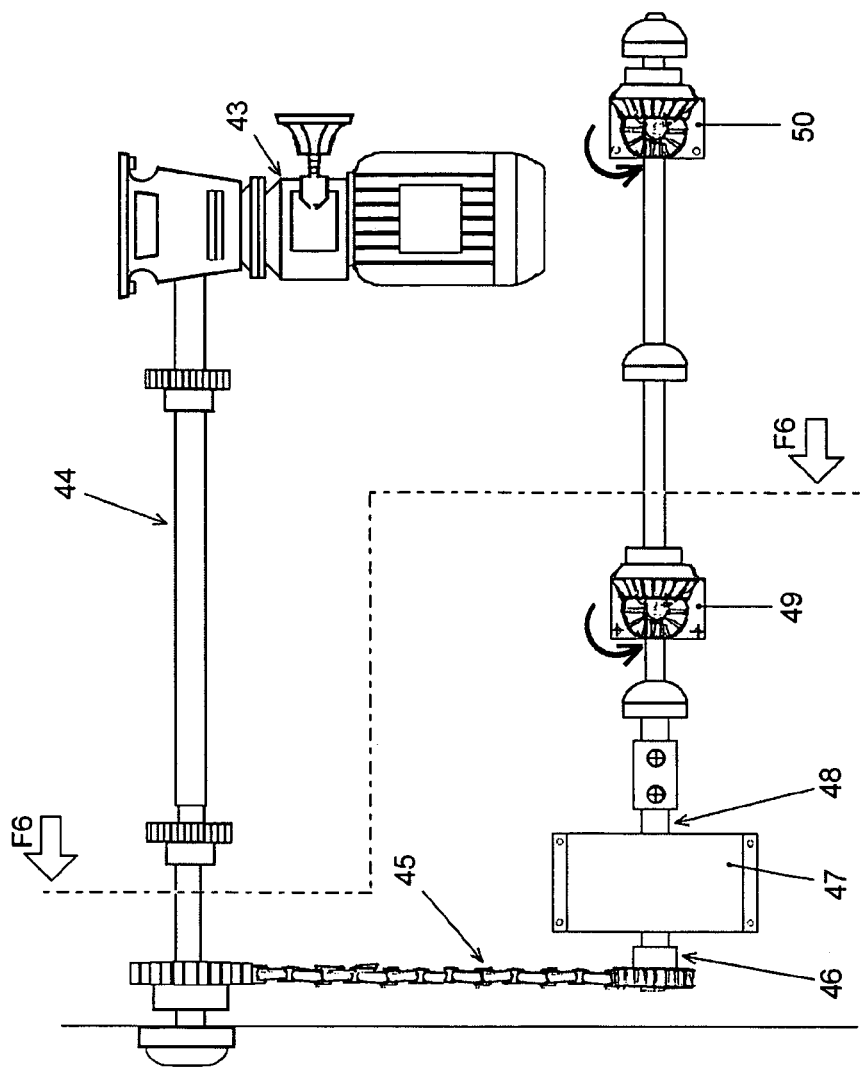
FIGS. 33 and 34 schematically show a possible embodiment for driving, by a motor, the semicircular blades which separate the skin (peel) from the fruit core; and specifically
Figure 34:
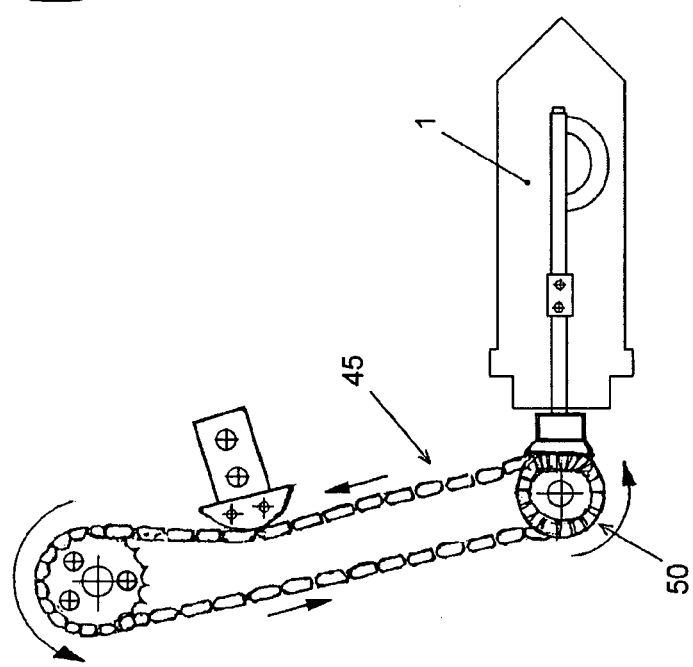

- the Start button is pushed and the machine starts to repeatedly and continuously perform its processing cycle, described above and shown schematically in FIGS. 3 to 12;
- the working rate is adjusted by the speed variator 43 of FIG. 33;
- at the "machine output station", to which a belt conveyor transports the processed fruits, a second operator separates the edible parts from the other parts and these other parts are discharged in a suitable waste container;
- if the product typology and the gauge of the product are changed, it is necessary to stop the machine and clean the same;
- then, the kit of the splitting blade 1 is replaced;
- if required, new adjustments of the registration rods 27 and 42/*bis* are performed;
- the new lot of fruits starts to be processed, by repeating the cycle from the beginning.

The invention claimed is:

1. A machine for peeling and coring fruit, comprising:
a mechanical feeder that centers fruit in a vertical direction;
clamping and centering pliers arranged to receive the fruit from the feeder and configured for automatically clamping of the fruit while centering the fruit both radially and axially;
plural fruit splitting blades arranged to receive the fruit from the pliers and to longitudinally split the fruit, including the fruit skin, into two halves;
an aperture within each splitting blade;
a kit removable installed within the aperture of each fruit splitting blade, each kit comprising a kit blade rotatable about an axis of rotation and each blade having an inner surface facing the axis of rotation and an outer surface spaced apart from the aperture of the fruit splitting blade at a distance to, upon rotation of the kit blade, separate fruit skin from an inside of the fruit, each kit being sized for one gauge of fruit, wherein,
the feeder, pliers, fruit splitting blades, and kits are synchronizable with respect to each other, and are operatively interconnected to i) have a center of gravity of the fruit coincide with a center of rotation of the kit blades, and ii) subdivide the fruit into plural groups of different gauges.

2. A machine according to claim 1, wherein said mechanical feeder comprises:
a cradle configured to accept the fruit placed thereon with an axis of the fruit pointing in a horizontal direction,
a clamping device for clamping the fruit on said cradle,
a height-aligning mechanical assembly configured to align, in height, a center line of the fruit with respect to an axis of rotation of said kit blades,
an adjustment rod configured to adjust a position of alignment of the fruit in accordance with the gauge of the fruit, and
a shifting mechanical assembly, which shifting mechanical assembly shifts transfers the fruit to said pliers.

3. A machine according to claim 1, further comprising a shifting mechanical assembly to shift the pliers until the center of gravity of the fruit coincides with an axis of rotation of said kit blades.

4. A machine according to claim 3, wherein said pliers are configured to move in translation so that the fruit contacts said fruit splitting blade and said fruit splitting blade splits the fruit longitudinally into two identical parts.

5. A machine according to claim 1, wherein said kit blades are integral with a spindle set in rotation by an intermittently actuated mechanical device.

6. A machine according to claim 5, wherein, upon the center of gravity of an individual piece of the fruit being in a concentric position on a rotation axis of said kit blades, said spindle rotates by 360° so that the kit blades separate both fruit skin and fruit core from an inside of the fruit to separate edible pulp from outer skin and from a central region containing pips.

7. A machine according to claim 1, further comprising:
a machine frame, wherein,
said kits each include a plate of one of a first kind and a second kind, said plate removably mounted in said aperture, and
said fruit splitting blade (1) i) has a flat portion, ii) is substantially flat and sufficiently long and wide to be able to divide into two halves a predetermined maximum size of the fruit; and iii) has the aperture (1/b) provided in the flat portion, the aperture adapted to receive and fix the plate (2/a); iv) has a tip (1/a) which is lance-shaped and chamfered; and iv) has an end opposite to the tip with a structure (9, 10) configured to be rigidly mounted on the machine frame.

8. A machine according to claim 7, wherein said kits:
have a first configuration for processing melons, the first configuration of each kit including:
plural of said kit blade rotatable about the axis of rotation and spaced at different distances from the aperture of the fruit splitting blade,
said plate of the first kind configured to be inserted in said aperture of said fruit splitting blade;
a blade-supporting spindle, integrally carrying said plural kit blades,
an aperture formed in said plate of the first kind, said aperture receiving said kit blades and allowing rotation of said kit blades, and
a thickness of the plate of the first kind and of the blade-supporting spindle, and a width of the kit blades, do not exceed a thickness of the splitting blade; and
have a second configuration for processing pineapples and, the second configuration of each kit including:
said plate of the second kind configured to be inserted on said fruit splitting blade,
a blade-supporting spindle, integrally carrying said kit blades, an aperture formed in said plate of the second kind, said aperture receiving said kit blade and allowing rotation of said kit blade, and a thickness of the plate of the second kind and of the blade-supporting spindle, and a width of the kit blades, do not exceed a thickness of the splitting blade, a circular plug cutter comprised of two separate parts integrally fixed opposites sides of the plate of the second kind and on the center line of the plate of the second kind, said two separate parts being fixed in coincident positions and an end of the plate of the second kind located near the tip of the splitting blade; and further comprising parts for replacing, within one of said splitting blades, a kit of the first configuration with a kit of the second configuration.

9. A machine according to claim 8, wherein, the kit blades of the kits of the first configuration for processing melons are one of semicircular and half-oval blades, the kit blades of the kits of the second configuration for processing pineapples comprise a single, shaped blade in combination with the circular plug cutter, kits of a third configuration for processing watermelons comprise a single, shaped blade, and kits of a fourth configuration for peeling watermelons and for recovering a watermelon pipless central portion comprise a single, shaped blade in combination with a circular plug cutter.

10. A machine according to claim 1, further comprising:

a circular plug cutter configured to separate a central fibrous fruit stem from the fruit, the plug cutter comprising two separate parts mounted on opposite sides of a centreline of said splitting blade.

11. A machine according to claim 2, further comprising a shifting mechanical assembly to shift the pliers until the center of gravity of the fruit coincides with an axis of rotation of said semicircular blades.

* * * * *

UNITED STATES PATENT AND TRADEMARK OFFICE
CERTIFICATE OF CORRECTION

PATENT NO. : 7,581,491 B2  Page 1 of 1
APPLICATION NO. : 11/190909
DATED : September 1, 2009
INVENTOR(S) : Ascari et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 916 days.

Signed and Sealed this

Fourteenth Day of September, 2010

David J. Kappos
*Director of the United States Patent and Trademark Office*